United States Patent [19]
Adkins et al.

[11] Patent Number: 6,113,679
[45] Date of Patent: Sep. 5, 2000

[54] PIEZO INKJET INKS AND METHODS FOR MAKING AND USING SAME

[75] Inventors: Ronald R. Adkins, Woodbury; Robert M. Vorwerk, St. Paul; Ronald K. Thery, New Brighton, all of Minn.

[73] Assignee: 3M Innovative Properties Company, St. Paul, Minn.

[21] Appl. No.: 09/167,034

[22] Filed: Oct. 6, 1998

[51] Int. Cl.$^7$ ................................................ C09D 11/00
[52] U.S. Cl. ................... 106/31.6; 106/31.86; 106/31.89
[58] Field of Search ................ 106/31.6, 31.86, 106/31.89; 347/68, 153

[56] References Cited

U.S. PATENT DOCUMENTS

| | | | |
|---|---|---|---|
| 5,288,316 | 2/1994 | Auslander et al. | 106/27 |
| 5,744,519 | 4/1998 | Heraud et al. | 106/31.86 |
| 5,755,860 | 5/1998 | Zhu | 106/31.15 |
| 5,879,512 | 3/1999 | McGenity et al. | 106/31.6 |

FOREIGN PATENT DOCUMENTS

| | | | |
|---|---|---|---|
| 2-038473 | 2/1990 | Japan | C09D 11/16 |
| 4-309573 | 2/1991 | Japan | C09D 11/00 |
| 4-063876 | 2/1992 | Japan | C09D 11/00 |

*Primary Examiner*—Mark L. Bell
*Assistant Examiner*—Veronica F. Faison
*Attorney, Agent, or Firm*—Dale A. Bjorkman

[57] ABSTRACT

An organic solvent-based piezo ink is disclosed having (a) pigment particles; (b) binder; (c) plasticizer; (d) organic solvent; (e) a fluorochemical surfactant; and (f) an antifoaming agent comprising silica and silicone oil. Optionally light and heat stabilizers are also included. Method of making and using this ink are also disclosed.

19 Claims, No Drawings

PIEZO INKJET INKS AND METHODS FOR MAKING AND USING SAME

FIELD OF INVENTION

This invention relates to organic solvent-based inks for piezo inkjet printing and the methods of making and using such inks.

BACKGROUND OF INVENTION

Inkjet imaging techniques have become very popular in commercial and consumer applications. The ability to use a personal computer and desktop printer to print a color image on paper or other receiving substrate has extended from dye-based inks to pigment-based inks. The latter provide brilliant colors and more durable images because pigment particles are more durable than dyes on the receiving substrate.

Thermal inkjet print heads are commercially available from Hewlett Packard Corporation or LexMark Corporation in inkjet printers commercially available from Hewlett Packard Corporation, Encad Inc., Mimaki Corporation, and others.

Piezo inkjet print heads are commercially available from Topaz Technologies (Sunnyvale, Calif.), Epson Corporation (Torrance, Calif.). Data Products (Woodland Hills, Calif.), Modular Ink Technologies (Dallas, Tex.). and others. These printheads differ in physical properties such as frequency and drop volume and the inks to be used in them often require different physical properties such as viscosity. Such print heads are used in piezo inkjet printers commercially available from Idanit Technologies, Ltd. of Rishon Le Zion Israel; Raster Graphics of San Jose, California; Vutek Inc. of Meredith, N.H.; Olympus Optical Co. Ltd. of Tokyo, Japan and others.

Inkjet printers have been in general use for wide-format electronic printing for applications such as, engineering and architectural drawings. Because of the simplicity of operation, economy of inkjet printers, and improvements in ink technology the inkjet imaging process holds a superior growth potential promise for the printing industry to produce wide format, image on demand, presentation quality durable graphics.

The components of an inkjet system used for making image graphics can be grouped into three major categories:

1 Computer, software, printer with print head and plumbing components.
2 Ink.
3 Receiving substrate.

The computer, software, and printer will control the size, number and placement of the ink droplets and will transport the receiving substrate. The ink will contain the colorant or pigments which form the image and the receiving substrate provides the medium which accepts and holds the ink. The quality of the inkjet image graphic is a function of the total system. However, the composition and interaction between the ink and receiving substrate is important in an inkjet system only after the ink has traversed the plumbing of the printer and been jetted through the print head without damage to either the print head or the ink.

Image quality is what the viewing public and paying customers will want and demand to see. Many other demands are also placed on the inkjet media/ink system from the print shop, such as rapid drying, humidity insensitivity, extended shelf life, waterfastness and overall handleability. Also, exposure to the environment can place additional demands on the media and ink (depending on the application of the graphic). Typically, outdoor durability includes withstanding temperature extremes, exposure to moisture ranging from dew to rainstorms, and colorfast stability in the face of sunlight's ultraviolet light.

The chemical formulation of the pigmented inkjet ink has considerable complexity due to the requirement of continued dispersion of the pigment particles in the ink supply vessel and during jetting of the ink, yet rapid drying once the ink has been jetted on to the receiving substrate.

Piezo inkjet inks have distinct advantages over thermal inkjet inks. Thermal inkjet inks are limited to water-based systems. Because of the high temperatures involved in the thermal print head jetting process, the use of binders are limited because such binders form a residue on the heating elements of the print heads, a problem that is called "kogation" in the art. The presence of residue results in failure of the print heads to provide quality image graphics or even their need to be replaced on a regular basis.

Further, in order to prevent these water-based thermal inkjet systems from drying too early, i.e., while in the print head nozzles, these inks contain a high concentration of glycols or other type of humectant. This high concentration of glycols prevents the inks from drying completely once the thermal inkjet ink is jetted to form the image on the receiving substrate. Because as noted above, these inks have essentially no binder in their formulation, which would otherwise have permitted the formation of a film of the ink drops on the receiving substrate after the evaporation of water.

The combination of these jetting and drying conditions for thermal inkjet inks has forced thermal inkjet inks to be jetted onto receiving substrates that have a specialized ink-receptive layer. Several examples of specialized inkjet media include U.S. Pat. Nos. 5,747,148; 5,389,723; and 5,472,789. All of these inkjet media concern the issue of the disposition of liquid after jetting has occurred for pigment-based inkjet inks.

Moreover, because thermal inkjet inks cannot have a binder in their formulation, durability from exposure to the effects of the environment for the resulting image graphic is obtained by the use of an overlaminate, typically provided by a clear coating of a rapid-drying solution or a film that adhesively laminates to the resulting image.

Piezo ink print heads jet their ink by a mechanical action as opposed to heating. Piezo inks can be aqueous or non-aqueous and can include a film-forming binder. The viscosities of these inks are higher than those of thermal inkjet inks. Thermal inkjet inks typically have viscosities around about 3–5 centipoise (mPa·sec), whereas pigmented piezo inks typically have a viscosity of from about 10 to about 20 mPa·sec at 25° C. depending on the type of piezo jet print head and the particulars of its specifications and performance.

However, viscosities of piezo inks are orders of magnitude lower than screen print inks used in the printing industry. Screen print inks typically have viscosities of at least about 1000 mPa·sec at time of usage. In commercially available screen print inks from Minnesota Mining and Manufacturing Company, such inks include pigment, binder, plasticizer, stabilizers, silicone oils, and solvents. The percent solids of such inks are typically between about 30 and 40 percent. In one of such inks, a fluorochemical flow agent is added for assuring complete covering of the image graphic as a clear coating. In other of such inks, to assure porosity and facilitate air passage, a minor amount of silica particle is dispersed. But none of the inks has both a fluorochemical flow agent and dispersed silica particles, because the properties of one would counteract the properties of the other.

Piezo ink jet inks have their own set of problems to overcome to achieve a high quality image with acceptable durability for its intended usage. A variety of others have attempted to develop and market piezo ink jet inks. Among these that use volatile organic solvent systems for delivery of ink through the print head and to the receiving substrate are Salsa brand inks marketed in conjunction with Salsa brand printers from Signtech of San Antonio, Tex.; Crisper brand inks from Precision Color of Newbury, Berkshire, U.K., and piezo inks from Inkware Corporation of Las Vegas, Nev., USA.

However advanced these other piezo ink jet inks may be, there are complications attendant to how an organic solvent-based piezo ink jet can successfully be jetted through piezo ink jet print heads having drop sizes most often ranging from about 30 to about 70 picoliters (pL) that are common for the print heads used in wide format piezo ink jet printers commercially available from the printer manufacturers identified above. Most particularly the quality and durability of the resulting image graphic is directly dependent on the ink formulation that navigates the jetting process yet forms an image graphic on the receiving substrate suitable for intended usages.

SUMMARY OF THE INVENTION

What the art needs is an organic solvent-based ink that has excellent properties of viscosity, flash point, specific gravity, pigment:binder ratios, solids percentage content, antifoaming, and flow in order to produce durable image graphics with piezo ink jet print heads that deliver about nominal 20–70 pL drops of ink. The art needs an ink formulation that includes a solvent and additive combination that delivers ink to the print head without damage to plumbing of the printer, jets the ink through the print head without damage to the print head or the ink, and dries rapidly on the receiving substrate. Each of these properties will be addressed separately.

Piezo inks can use higher viscosity inks through a piezo ink print head which allows for the use of binders and pigments that one could not use at the lower viscosities of thermal inkjet inks and also can allow one to obtain a stable ink film formed on the receiving substrate that can impart durability without the use of a clear coat or overlaminate as protection for the resulting image graphic.

Further, because piezo inks of the present invention can contain both a binder and rapidly-drying organic solvents, these inks can be jetted directly onto films without the need of specialized porous receiving substrates as identified above that are used to address the slower drying humectant-containing water systems of thermal inkjet inks.

Inks of the present invention are believed to be able to last outdoors for at least three years without a clear coat or overlaminate and for an additional two years if an optional clear coat or overlaminate on selected receiving substrate is used.

Inks of the present invention can form excellent image graphics on conventional polymeric films, such as vinyl films, that are not specially treated with coatings or formulations to aid in the dispensation of liquids used in the inks. Excellent polymeric films for use with inks of the present invention include Scotchcal™ brand films from Minnesota Mining and Manufacturing Company (3M) of St. Paul, Minn., USA.

The present invention solves the problems in the art by providing an ink system having the ability to disperse pigment particles in the solvent, permit uninterrupted flow through the piezo inkjet print head, and assure rapid drying of the ink of pigment particles and binder once the ink contacts a conventional polymeric film to form a durable image graphic. The selection and balance of liquids used to assist the pigment particles and binder to form an image graphic unexpectedly produces image graphics not previously produced with piezo inkjet printers.

The present invention has found two different types of chemicals need to be combined to permit flow through the print head yet rapid evaporation from the receiving substrate. The combination of these flow agents has an unexpected result for the present invention. It is known that silicone oils can serve as flow agents, e.g., see U. Kaluza, "Flocculation of Pigments in Paints—Effects and Causes," *Progress in Organic Coatings*, 10, 289 (1982). Such silicone oils have been found to cause ink running on some conventional substrates with high ink coverage because the oils can slow the evaporation of solvent. Avoiding ink running is critical for a substrate in a vertical position during printing due to the effects of gravity. The route to correction of that problem, the use of more volatile solvents for the ink, encounters the unavoidable problem of limiting the flash point of the inks to remain above about 61° C. (142° F.), which temperature is significant in regulations involving shipping of volatile chemicals. Thus, a careful balance of flow agents has been found to be needed to inhibit evaporation within the printer but encourage evaporation on the receiving substrate.

One type of flow agent is a fluorochemical surfactant that is efficient in lowering the surface tension of organic solvents but can encourage foaming in an organic solvent. This flow agent is similar to those fluorochemicals used in screen printing inks to provide a continuous layer that is important for clear coatings to protect a finished image graphic.

The second type of flow agent is an antifoaming silicone oil that discourages any inadvertent foaming tendency caused by the presence of the fluorochemical surfactant. Many antifoaming silicone oils used in screen printing inks have viscosities ranging from about 5 to about 1000 mPa·sec. Significantly, the preferred antifoaming silicone oil used in the present invention has a much higher viscosity, at least about 1500 mPa·sec and preferably at least 2500 mPa·sec, which is unexpectedly beneficial in an ink having a viscosity requirement that is a minor fraction of the viscosity found in screen printing inks. All of these viscosities are measured at 25° C. Most significantly, the antifoaming silicone oil useful in the present invention contains silica particles, which is able to provide a means to reduce foaming without otherwise harming the flow properties of the ink contributed by the fluorochemical surfactant.

Therefore, unexpectedly, minor amounts of a fluorochemical surfactant and a silica-containing antifoaming agent combine to provide superior flow properties for a piezo ink that has considerable limitations on viscosity and flashpoint.

One aspect of the present invention is an organic solvent-based piezo ink, comprising: (a) pigment particles; (b) binder; (c) plasticizer; (d) organic solvent; (e) a fluorochemical surfactant; (f) an antifoaming agent comprising silica and silicone oil; wherein the ink has a viscosity of less than 100 mPa·sec measured at 25° C. and a shear rate of at least 1000 sec$^{-1}$. Viscosity and shear rate are measured on a Cone And Plate Rheometer according to techniques known to those skilled in the art.

Another aspect of the present invention is a method of making an ink formulation described above, (a) placing pigment into an organic solvent to form a pigment paste; and (b) mixing the pigment paste, binder, plasticizer, fluorochemical surfactant, antifoaming agent comprising silica and silicone oil, into the same organic solvent or a different organic solvent.

Another aspect of the present invention is a method of using an ink formulation described above, comprising the steps of activating a piezo ink jet print head and ejecting drops of ink on demand of a size ranging from about 10 to about 150 pL from the piezo ink jet print head onto a polymer film.

A feature of the present invention is the ability to mix a variety of solvents, additives and stabilizers without adversely affecting flow of the ink.

Another feature of the present invention is the ability to use commercially available chemicals to formulate piezo inks of the present invention.

An advantage of the present invention is printing of excellent quality, large format, high resolution, image graphics without damage to piezo inkjet print heads but with excellent evaporation of organic solvents from the ink printed on media. This advantage is especially significant because the presence of the higher viscosity silicone oil is able to overcome the tendency of fluorochemical surfactants to foam during motion. The minimization of foam assures good flow of the ink through the piezo inkjet head that operates with bursts of abrupt motion to eject ink on demand onto the receiving substrate.

Another advantage of the present invention is the formation of image graphics of at least three years outdoor durability in vertical applications without the requirement of a clear coating or overlaminate to protect such graphics. This advantage is especially significant because one component of the flow agents is silica that is otherwise known to provide porosity in an ink deposited on a receiving substrate. Thus, for this advantage, the benefits of the fluorochemical surfactant are unaffected in the resulting image graphic.

Another advantage of the present invention is the ability to adjust pigment and binder concentrations in the ink formulation to tailor viscosity of the ink to be accommodated in a variety of piezo inkjet print heads. This adjustment of viscosity does not otherwise adversely affect the balance of properties provided by the two types of flow agents used in the ink.

Another advantage of the present invention is the ability to use a variety of polymeric materials as plumbing components that are essentially unreactive with components in the ink formulation of the present invention such that an expensive, large production piezo inkjet printer with multiple expensive print heads can be insulated from internal damage due to incompatible chemicals.

Further features and advantages are identified in conjunction with a discussion of the following embodiments of the invention.

EMBODIMENTS OF INVENTION

Receiving substrate

Conventional polymeric films can be used directly as media for inks of the present invention. Nonlimiting examples of such films include single and multi-layer constructions of acrylic-containing films, poly(vinyl chloride)-containing films, (e.g., vinyl, plasticized vinyl, reinforced vinyl, vinyl/acrylic blends), urethane-containing films, melamine-containing films, polyvinylbutyral-containing films, and multi-layered films having an image reception layer comprising an acid- or acid/acrylate modified ethylene vinyl acetate resin, as disclosed in U.S. Pat. No. 5,721,086 (Emslander et al.), the disclosure of which is incorporated herein by reference, or having an image reception layer comprising a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature, as disclosed in copending, coassigned, U.S. patent application Ser. No. 09/109,471 (Emslander et al.), the disclosure of which is incorporated by reference.

Such films have two major surfaces with one surface being able to receive an inkjet image graphic of the present invention and the other major surface being adhered to a field of pressure sensitive adhesive. Usually, the field of adhesive on one major surface is protected by a release liner. Such films can be clear, translucent, or opaque. Such films can be colorless or solid color or a pattern of colors. Such films (typically with adhesive and liner) can have a thickness ranging from about 0.127 mm (5 mils) to as thick as can be accommodated by a commercial inkjet printer. Such films can be transmissive, reflective, or retroreflective. Such films can be as wide as can be accommodated by a commercial inkjet printer, allowing for the inks to suitably dry after printing, usually in a vertical alignment.

Commercially available films known to those skilled in the art include the multitude of Panaflex™, Nomad™, Scotchcal™, Scotchlite™, Controltac™, and Controltac-Plus™ brand films and materials from 3M.

Printers

Ink formulations of the present invention are adaptable to be used with a variety of commercially available piezo inkjet printers. Nonlimiting examples of such printers include those identified above. These printers use different types of piezo inkjet print heads, including without limitation, those print heads identified above, and those manufactured by Tektronix of Wilsonville, Oreg.; Trident of Brookfield, Conn.; Spectra of Hanover, N.H.; and Microfab of Austin Tex. Two print heads often used are from Data Products and MIT printheads available from Modular Ink Technologies/NuKote of Dallas, Tex.

Typically, such printers can print at speeds ranging from about 60 sq. ft/hr to about 600 sq. ft/hr (about 5.5 to 55 $m^2$/hr) and preferably from about 90 to about 450 sq feet/hr and operate to print at widths ranging from about 1 foot to about 16 feet (0.30 m to 4.8 m) and preferably from about 3 to about 6 feet. At such speeds and widths, considerable amounts of ink are used to print image graphics, requiring reservoirs to store sufficient volumes of ink of various colors to make image graphics efficiently. The transport from reservoir to print head(s) requires plumbing which can not be damaged by the components in the ink formulation.

Inks of the present invention can avoid significant damage to the plumbing of the printer if that plumbing, such as tubing, valves, pumps and the like, is made from polyolefins (e.g., polyethylene or polypropylene); fluorinated polyolefins (e.g., polytetrafluroethylene (PTFE) and fluorinated ethylenes); glass; stainless steel; polyesters; PTFE-encapsulated silicone rubbers; polyimides, and hydrocarbon rubbers. Especially useful for such plumbing is an extrudable amorphous polyethylene that can be made optically clear, such as that material commercially available as Zeonex 250 polyethylene resin from Zeon Chemicals of Rolling Meadows, Ill., USA. Another useful material is polypropylene that can be assembled with adhesives.

Print heads deliver ink drops in sizes ranging from about a nominal 10 pL to about a nominal 150 pL and preferably from about a nominal 20 pL to about a nominal 70 pL. Resolution of the inkjet image graphic ranges from about 200 dots-per-inch (dpi) to about 800 dpi and preferably from about 300 dpi to about 600 dpi.

Ink

Piezo inkjet printing principally relies on the use of four colors: cyan, magenta, yellow, and black (CMYK). However, to improve resolution of images, some printers identified above also add two additional colors that are less concentrated relatives of the cyan and magenta inks, called "light cyan" and "light magenta." Additionally, printers and software can be configured to use "special" or "spot" colors that are specific hues based on large usage or commercial branding requirements. For example, the color of red employed in branding of the corporate logo of 3M can be a special color.

Viscosities for solvent-based piezo inks of the present invention are less than 100 mPa·sec and desirably are less than 50 mPa·sec because of the requirements of the piezo print head. Preferred viscosities can range from about 7 to about 11 mPa·sec and preferably from about 8 to about 10.5. Most preferably, the viscosity is about 10.0 mPa·sec. All of these viscosities are measured at 25° C. and a shear rate of at least 1000 sec$^{-1}$. Of all of the properties of the ink formulation for solvent based inks, viscosity is the most critical because of the demands of the print head to operate properly with a liquid being ejected in such small volumes on demand. While the preferred ranges of viscosities are quite narrow, it is contemplated that, in the future, higher viscosities will be possible due to advances in piezo inkjet print heads. By comparison, the range of viscosity for press-ready solvent-based screen printing inks that are commercially available range from 1000–2000 mPa·sec at 25° C. measured with a shear rate of at least 1000 sec$^{-1}$. Not only are screen printing inks more than an order of magnitude more viscous, but also, the tolerance range of the acceptable viscosity is much less rigorous than that required for piezo inkjet inks. For that reason, components suitable for screen print inks are not automatic candidates for use in piezo inks. For example, screen print inks do use silicone oils but typically of a lower viscosity (5–1000 mPa·sec)as identified above. The selection of a higher viscosity silicone oil for ink of the present invention is contrary to both the concern about the viscosity of the piezo ink which must finely tuned to the particular piezo inkjet print head within a narrow range, as expressed in preference above and the concern that a higher viscosity silicone oil would not disperse well or remain dispersed well in the ink.

Flash points for inks of the present invention can be at least 142° F. (61° C.) and desirably range from about 142° F. to about 180° F. (61° C.–82° C.), and preferably from about 62° C. to about 65° C. A flash point of at least 142° F. is above a regulation temperature for shipment of chemicals by air, which is very important in transportation costs and delivery timing for customers using such inks.

Percentage solids in inks of the present invention can range from about 6% to about 11% and preferably from about 7% to about 10% because of the goal of maintaining the viscosity of the ink formulation within the range identified above. These percentage solids are considerably less than the typical 30–40% percent solids used in solvent-based screen printing inks because of the narrow range of viscosities that can be tolerated in a piezo inkjet print head.

Specific gravity of inks of the present invention can range at room temperature from about 0.97 to about 1.01 and preferably from about 0.98 to about 0.99. Again the tolerances of piezo inkjet print heads dictate these ranges.

The ratio of pigment:binder in inks of the present invention can range, according to color and use of "strong" and "light" colors, from about 0.03:1.0 to about 0.70:1.0.

Particle size based on volume distribution for inks of the present invention can range from about 0.06 to about 0.50 μm and preferably about 0.2 μm or less. Another way of approximating dispersion properties is to measure pigment particle settling. This test uses a Byk Gardner Dynometer Plus instrument (commercially available from Byk Gardner of Columbia, Md.). After filtering to less than 0.5 μm particle size, it was found that particle settling ranged from about 1 to about 10 mg and preferably from about 1 mg to about 2 mg of pigment settling over 3 days. These particle settling data are especially unexpected because good values by this measurement range from less than 50 mg of pigment settling over 3 days to less than 60 mg of pigment settling over 5 days.

Surface wetting by the ink drop of the receiving substrate is an indication of flow for inks of the present invention. Contact angles (as equilibrium contact angles on paraffin wax) can range from about 2° to about 35° and preferably from about 14° to about 22°.

Pigments

As identified above, the number of colors can range from four basic colors to any number of special colors to augment large volume image graphics printing needs.

The art of organic solvent-based screen print inks can be utilize for candidates as pigments for inks of the present invention. One skilled in the art can select from commercially available pigments, preferably available as vinyl-containing chips from Ciba Specialty Chemicals of Newport, Del., USA or from Penn Color of Doylestown, Pa., USA.

Nonlimiting examples of cyan pigments include Irgalite GLG (Ciba Specialty Chemicals of Greensboro, N.C.) and Sunfast 249-1284 (Sun Chemical Corporation of Fort Lee, N.J.).

Nonlimiting examples of magenta pigments include Quindo magenta RV-6828 (Bayer of Pittsburgh, Pa.) and Magenta B RT-343-D (Ciba Specialty Chemicals).

Nonlimiting examples of yellow pigments include Fanchon Fast yellow Y5686 (Bayer) Fanchon yellow Y5688 (Bayer), and Sandorin 6GL (Cariant of Charlotte, N.C.)

Nonlimiting examples of black pigments include Pfizer lampblack LB-1011 (Pfizer of Easton, Pa.) and Raven 1200 (Columbian Chemicals of Atlanta, Ga.).

Pigments predispersed into a vinyl resin ("chips") are typically pre-mixed into pastes according to techniques known to those skilled in the art. The pastes comprise the pigment chips selected from those identified above with a solvent such as cyclohexanone or ethylene glycol butyl ether acetate (EB Acetate) in a weight percent ratio of pigment to solvent ranging from about 10:90 to about 50:50 and preferably from about 25:75 to about 35:65.

The weight percent of pigment pastes in inks can range from about 1 to about 40 and preferably from about 1 to about 25 weight percent.

Binders

Binders are typically resins that are compatible with pigment particles such that upon evaporation of volatile components of the ink, the binders form films of the deposited pigments on the receiving substrate.

Nonlimiting examples of suitable binders are polymeric resins such as vinyl-containing polymers (e.g, VYHH, VYNS, VYHD, and VAGH brand vinyl-containing resins from Union Carbide) and acrylic-containing polymers (e.g., polymethylmethacrylate, polymethylbutylacrylate, polyethylmethacrylate and copolymers thereof). Preferred binders are Acryloid A11 brand resin from Rohm and Haas and VAGH brand resin from Union Carbide.

The weight percent of binders in inks can range from about 4.0 to about 8.0 according to desired pigment:binder ratios and durability requirements for resulting image graphics in outdoor environments.

Solvents

Solvents useful in inks of the present invention include cyclohexanone, propylene glycol monomethyl ether acetate (PM acetate), diethylene glycol ethyl ether acetate (DE acetate), isophorone; ethylene glycol butyl ether acetate (EB acetate); dipropylene glycol monomethyl acetate (DPM acetate); and combinations thereof. The amount of solvent is determined by the amount of other components in the ink formulation, typically about 90 to 94 weight percent.

Surface tension of solvents useful in the present invention can range from about 27 ergs/cm to about 36 ergs/cm when measured at 25° C., the same temperature as used to determine viscosity.

Fluorochemical Surfactants

Fluorochemical surfactants in the present invention provide a critical element as a flow agent to lower the surface tension of solvents, in order for the inks to flow out better on the receiving substrate. Such fluorochemical surfactants are solutes in solvents used in the present invention.

Nonlimiting examples of fluorochemical surfactants include the family of FC branded chemicals from 3M and preferably includes Fluorad FC430 and FC431. Such chemicals are fluorinated alkyl esters.

The weight percent of such fluorochemical surfactants in inks of the present invention can range from about 0.1 to about 0.5 and preferably from about 0.20 to about 0.30.

Antifoaming Agent

Antifoaming agents, most often silicone oils, can be dispersed in solvents used in the present invention to aid in minimizing foaming that might otherwise occur using the fluorochemical surfactants according to the present invention.

Nonlimiting examples of antifoaming silicone oils include Paint Additive 11 brand silicone oil (Dow Chemical of Midland, Mich.), SF96-5 brand silicone oil (General Electric (GE) of Waterford, N.Y.), SF69 brand silicone oil (GE), Silwet L-77 brand silicone oil (OSI of Danbury, Conn.), L-7657 brand silicone oil (OSI), Dow Corning Antifoam 1400 brand silicone oil (Dow Corning, Midland, Mich.) and AF9000 brand silicone oil from GE. If any of these desirable silicone oils do not commercially contain silica, then one skilled in the art can add such silica from commercially available sources to form a silica-containing antifoaming silicone oil useful in the formulation of the ink. However, it is preferable to have the silica contained with the antifoaming silicone oil from the manufacturer.

The viscosity of silicone oils useful in the present invention can be at least 5 mPa·sec at 25° C. Preferably, the viscosity can be from about 1000 mPa·sec to about 30,000 mPa·sec at 25° C.

The weight percent of the antifoaming agent, preferably in the form of the silica-containing antifoaming silicone oils, in inks of the present invention can range from about 0.01 to about 1.0 and preferably from about 0.025 to about 0.25.

These silica-containing antifoaming agents used in the present invention provide an unexpected balance of properties. The amount of silica dispersed in the silica-containing antifoaming agent ranges from about 10 to 50 weight percent, making the total amount of silica particulate contained in the ink to be about 0.01 to 0.03 weight percent. Yet the presence of such silica does not adversely affect the flow agent properties or the clear coating effect of the inks as contributed by the fluorochemical surfactant. Moreover, as explained above, the use of a higher viscosity polydimethylsiloxane silicone oil in combination with such silica particles unexpectedly provides antifoaming properties without adversely affecting the other performance properties of the ink being jetted or once on the receiving substrate.

Plasticizers

Plasticizers are typically polyesters that are compatible with the vinyl and acrylic resins and any other binder used along with the stabilizers and flow agents such that upon evaporation of volatile components of the ink, the plasticizers aid the flexibility of the film formed from the deposited binder with pigments on the receiving substrate. The plasticizer also becomes part of the final ink film.

Nonlimiting examples of suitable plasticizers include Uniflex 312 brand plasticizer (Union Camp of Wayne, N.J.), Paraplex G-31 brand plasticizer (C. P. Hall of Chicago, Ill.) and Paraplex G-51 brand plasticizer (C. P. Hall).

The weight percent of plasticizers in inks of the present invention can range from about 0.1 to about 4.0 and preferably from about 0.2 to about 2.0.

Optional Heat and Light Stabilizers

To enhance durability of a printed image graphic, especially in outdoor environments exposed to sunlight, a variety of commercially available stabilizing chemicals can be added optionally to inks of the present invention. These stabilizers can be grouped into the following categories: heat stabilizers; ultra-violet light stabilizers; and free-radical scavengers.

Heat stabilizers are commonly used to protect the resulting image graphic against the effects of heat and are commercially available as Mark V1923 brand stabilizer (Witco of Houston, Tex.), Synpron 1163 brand stabilizer (Ferro of Cleveland, Ohio), Ferro 1237 brand stabilizer (Ferro), and Ferro 1720 brand stabilizer (Ferro). Such heat stabilizers can be present in amounts ranging from about 0.02 to about 0.15 weight percent.

Ultra-violet light stabilizers are commercially available as Uvinol 400 brand benzophenone uv-absorber (BASF of Parsippany, N.J.) and Tinuvin 900 brand uv-absorber (Ciba Specialty Chemicals) and can be present in amounts ranging from about 0.1 to about 0.25 weight percent of the total ink.

Free-radical scavengers can be present in an amount from about 0.05 to about 0.25 weight percent of the total ink. Nonlimiting examples of the scavenger include hindered amine light stabilizer (HALS) compounds, hydroxylamines, sterically hindered phenols, and the like. Preferably, the free-radical scavenger is regenerating such as existing with the HALS compounds. Commercially available HALS compounds include Tinuvin 292 hindered amine light stabilizer (Ciba Specialty Chemicals) and Cyasorb UV3581 hindered amine light stabilizer (Cyanamid of Wayne, N.J.).

Mixing Ink Formulations

Conventional mixing techniques are used to mix the pigment paste with the various other components in the inks. Typically, such mixing techniques use a high shear dispersing blade operating at such speeds for such times as completely to disperse and dissolve the chips into the solvent. The pastes are then blended in with solvents, stabilizers, flow agents, and some resin solutions according to mixing techniques known to those skilled in the art using a conventional mixing blade. After a thorough mixing, the inks are filtered and then packaged. The nature and amount of solvents can be varied according the pigments employed.

Using Ink Formulations

Once mixed, the inks of the present invention have a stabilized shelf life acceptable for use in large volume piezo inkjet printing. Preferably, such inks can be used in piezo inkjet printers produced by Raster Graphics. Idanit Co. Ltd., and the like, although some variations will be necessary to optimize the formulations of such inks for use in different printers. More particularly, the inks of the inventions should be formulated according to the specifications and performance requirements of print heads. For example, inks prepared in the following examples were tested using MIT print head made by Modular Ink Technologies, both at nominal 20 pL and nominal 70 pL drop sizes. It is contemplated that other print heads will require different viscosities and other minor adjustments to the formulation without departing from the scope of the present invention.

The presence of two different types of flow agents: fluorochemical surfactants and silica-containing silicone oil antifoaming agents accomplish the purposes of the present invention that only one of them could not accomplish. While not being limited to a particular theory, the fluorochemical surfactant minimizes the use of silicone oils as flow agents which have the disadvantage of slowing evaporation of solvents on the receiving substrate when present in high concentrations, e.g, above 0.1 weight percent. Yet the tendency of the fluorochemical surfactant to foam during agitation and motion is counteracted by a minor amount of a high viscosity silicone oil that also contains silica particles. This fine balance of properties for flow permits a superior piezo inkjet ink with outdoor durability and minimizing the need for overlaminates or clear coats.

Moreover, keeping the flashpoint above about 61° C. (142° F.) permits inks of the present invention to be shipped with less regulatory restrictions.

The embodiments are further explained in the following examples.

EXAMPLES

Table 1 establishes the identity and source of commercially available components used in the following examples.

TABLE 1

Commercial Inks and Components

| Brand Name | Chemical | Company | Location |
| --- | --- | --- | --- |
| Idanit Cyan Ink | Water-based Piezo Ink | Idanit Technologies Ltd. | Rishon Letzion, Israel |
| DuPont Cyan Ink | Water-based Piezo Ink | DuPont | Wilmington, DE |
| Byk 306 | modified silicone oil | Byk Chemie | Wallingford CT 06492-7656 |
| Byk 310 | modified silicone oil | Byk Chemie | |
| SF-96-5 | silicone oil | GE | Waterford NY 12188 |
| SF-1173 | silicone oil | GE | |
| SF-1202 | silicone oil | GE | |
| SF-1204 | silicone oil | GE | |
| SF-69 | silicone oil | GE | |
| FC 430 | Fluorochemical surfactant | 3M | St. Paul, MN |
| AF9000 | silicone oil with dispersed silica | GE | |
| Microlith K Series Chips | Pigment-Vinyl Chip | Ciba Specialty Chemicals | Newport, DE |
| PennColor Vinyl Chip | Pigment-Vinyl Chip | Penn Color | Doylestown, PA |
| Acryloid A11 | PMMA resin | Rohm and Haas | Philadelphia, PA |
| VAGH | Vinyl binder resin | Union Carbide | Danbury, CT |
| Uniflex 312 | polyester plasticizer | Union Camp | Wayne, NJ |
| Synpron 1163 | organo Ba/Zn stabilizer | Ferro | Cleveland, OH |
| Mark V1923 | organo Ca/Zn stabilizer | Witco | Houston, TX |
| Uvinol 400 | 2,4-dihydroxy-benzophenone uv absorber | BASF | Parsippany, NJ |
| Tinuvin 292 | Hindered amine light stabilizer | Ciba Specialty Chemicals | Newport, DE |
| DPM acetate | acetate solvent | Dow | Midland, MI |
| EB acetate | acetate solvent | Eastman | Kingsport, TN |
| PM acetate | acetate solvent | Dow | |
| Isophorone | ketone solvent | Union Carbide | |
| Cyclohexanone | ketone solvent | BASF | |
| Acryloid B82 | acrylic copolymer | Rohm and Haas | Philadelphia, PA |
| Acryloid B66 | acrylic copolymer | Rohm and Haas | |

Control Examples A–O and Example 1

A model cyan ink was prepared according to the following formulation, with only the component of flow agent being varied for the purpose of measuring contact angles according to the following test procedure for testing for the efficiency of flow agents based on contact angles. The results are given in Table 2. All amounts are expressed in weight percent.

The cyan paste was formulated from Microlith 4G-K Chip (25 wt. percent); isophorone (18.25 wt. percent) and EB Acetate (56.25 wt. percent) using a high shear dispersing blade and mixing for 120 minutes. The paste was used to make a model ink by mixing together 7.20% of the paste, 45.00% of a 20% solution of Acryloid B66 in EB acetate, 15.00% of DPM acetate solvent, and 32.80% of EB acetate solvent. After mixing, the ink is filtered through two Roki filters (from George E. Missbach Co. of Atlanta, Ga.)— HT60XA and HT30XA—in series, to reduce particle size sequentially to less than 5 μm and to less than 1.2 μm with over 95% efficiency.

Contact Angle Test Procedure:

A drop of the model cyan ink or the model cyan ink plus flow agent(s) was placed on a film of paraffin wax that had been deposited on a 3 inch (7.62 cm) square of aluminum. The contact angle of the drop was measured after 10 seconds with a Rame-Hart NRL goniometer (Rame-Hart of Mountain Lakes, N.J.). The ink with the lowest contact angle would be considered to be the best for flow out on a substrate. The precision of this test method is +/−2 degrees. The results with the amount and type of flow agent(s) were obtained and are in Table 2.

TABLE 2

Contact Angle Test

| Example | Flow Agent (Wt. %) | Contact Angle (°) |
|---|---|---|
| A | None | 33 |
| B | 1% Byk 306 | 32 |
| C | 1% Byk 310 | 29 |
| D | 1% SF96-5 | 30 |
| E | 1% SF1173 | 34 |
| F | 1% SF1202 | 33 |
| G | 1% SF1204 | 33 |
| H | 4% SF 69 | 14 |
| I | 1% SF 69 | 14 |
| J | 0.5% SF 69 | 14 |

TABLE 2-continued

Contact Angle Test

| Example | Flow Agent (Wt. %) | Contact Angle (°) |
|---|---|---|
| K | 0.025% SF 69 | 22 |
| L | 0.010% SF 69 | 28 |
| M | 0.25% FC 430 | 29 |
| N | DuPont Cyan Ink | 13 |
| O | Idanit Cyan Ink | 56 |
| 1 | 0.25% FC 430 and 0.05% AF9000 | 21 |

Based on the requirements for flash point and to minimize contact angle and to provide rapid drying of solvent on the receiving substrate, the comparison Examples B–G showed no appreciable improvement over Example A which contained no flow agent. Comparison Examples H–J would yield slow drying inks on receiving substrates, a problem in the art. Comparison Examples K and L are less wetting than Example 1. Comparison Example M tended to foam, which was corrected by the formulation of Example 1. Comparison Examples N and O are commercially available water based inks and show the range of contact angles for inks in the market for piezo inkjet print heads. Thus, Example 1 was preferred for use as an ink in the present invention because silicone oils alone were not being used that could cause running of inks on the receiving substrate. The comparison between Example M and Example 1 shows how the addition of the AF9000 Silicone Oil which contains silica in about 20–40 percent by weight of the total oil, reduces the contact angle from 29° to 21°, a significant reduction in contact angle and significant improvement in flow properties for appreciation by one skilled in the art concerned with wetting properties and contact angles.

Examples 2–7

A number of piezo inkjet inks of the present invention were prepared according to the procedures for paste preparation and ink preparation identified for Example 1 except that different pigments, binders and stabilizers were used, as seen in the Tables below.

Table 3 reports the ink formulations for these Examples and Table 4 reports the performance properties of the ink formulations.

TABLE 3

Ink Formulations (Wt. Percents)

| | Ex. 2 Magenta | Ex. 3 Black | Ex. 4 Yellow | Ex. 5 Cyan | Ex. 6 Light Magenta | Ex. 7 Light Cyan |
|---|---|---|---|---|---|---|
| Pigment Chip | Penn Color 81R78 30% | Microlith C-K -- 30% | Microlith 3R-K -- 30% | Microlith 4G-K -- 25% | PennColor 30% | Microlith 4G-K -- 25% |
| Paste Solvent | Cyclo-hexanone -- 70% | EB Acetate -- 70% | EB Acetate -- 70% | EB Acetate/ Isophorone -- 56.25%/ 18.75% | Cyclo-hexanone -- 70% | EB Acetate/ Isophorone -- 56.25% 18.75% |
| Pigment Paste | 22.44% | 21.68% | 21.0% | 8.16% | 5.00% | 1.68% |

TABLE 3-continued

Ink Formulations
(Wt. Percents)

|  | Ex. 2 Magenta | Ex. 3 Black | Ex. 4 Yellow | Ex. 5 Cyan | Ex. 6 Light Magenta | Ex. 7 Light Cyan |
|---|---|---|---|---|---|---|
| 20% Acryloid All in EB Acetate | 2.69% | 6.91% | 4.18% | 8.47% | 8.12% | 8.33% |
| 15% VAGH in cyclohexanone | 0.00% | 0.00% | 0.00% | 13.65% | 13.95% | 18.00% |
| Uniflex 312 | 0.64% | 1.00% | 0.21% | 1.23% | 1.68% | 1.78% |
| Synpron 1163 | 0.04% | 0.00% | 0.04% | 0.11% | 0.05% | 0.12% |
| Mark V1923 | 0.02% | 0.04% | 0.02% | 0.03% | 0.03% | 0.03% |
| Uvinol 400 | 0.10% | 0.13% | 0.09% | 0.23% | 0.21% | 0.21% |
| Tinuvin 292 | 0.02% | 0.04% | 0.02% | 0.05% | 0.05% | 0.05% |
| 5% FC430 in EB Acetate | 5.0% | 5.0% | 5.0% | 5.0% | 5.0% | 5.0% |
| 5% AF900 in EB Acetate | 1.0% | 1.0% | 1.0% | 1.0% | 1.0% | 1.0% |
| DPM Acetate | 25.0% | 25.0% | 25.0% | 25.0% | 25.0% | 25.0% |
| EB Acetate | 43.05% | 39.21% | 43.44% | 37.07% | 39.91% | 38.80% |

TABLE 4

Ink Performance

| Property | Ex. 2 Magenta | Ex. 3 Black | Ex. 4 Yellow | Ex. 5 Cyan | Ex. 6 Light Magenta | Ex. 7 Light Cyan |
|---|---|---|---|---|---|---|
| Viscosity (mPa·sec @ 25° C.) | 9.4 | 9.9 | 12.0 before filtering 9.3 after | 10.6 before filtering 10.2 after | 10.2 before filtering 10.0 after | 10.1 before filtering 10.0 after |
| Flashpoint (° C.) | 62.7° | 76.6° | 76.6° | 65.5° | 64.4° | 63.3° |
| Percent Solids | 8.40% | 9.39% | 7.73% | 7.96% | 7.53% | 7.28% |
| Specific Gravity | 0.97 | 0.99 | 0.98 | 0.98 | 0.97 | 0.98 |
| Pigment:Binder Ratio | 0.67 | 0.53 | 0.69 | 0.15 | 0.11 | 0.03 |

The black, cyan, magenta, and yellow inks were tested on an Olympus brand printer with Modular Ink Technology printheads with a nominal 30 pL drop size. The inks jetted well at the 360 dpi print mode but would not jet with the Olympus operating in a 720 dpi print mode.

The invention is not limited to the above embodiments. The claims follow.

What is claimed is:

1. An organic solvent-based piezo ink, comprising: (a) pigment particles; (b) binder; (c) plasticizer; (d) organic solvent; (e) a fluorochemical surfactant; (f) an antifoaming agent comprising silica and silicone oil; wherein the ink has a viscosity of less than 100 mPa·sec measured at 25° C. and a shear rate of at least 1000 $sec^{-1}$.

2. The ink of claim 1, further comprising a component selected from the group of a light stabilizer, a free-radical scavenger, a heat stabilizer, and combinations thereof.

3. The ink of claim 1, wherein the viscosity of the silicone oil is at least 5 mPa·sec at 25° C.

4. The ink of claim 3, wherein the viscosity of the silicone oil is from about 1000 mPa·sec to about 30,000 mPa·sec at 25° C.

5. The ink of claim 1, wherein the weight percent of the antifoaming agent is from about 0.01 to about 1.0.

6. The ink of claim 5, wherein the weight percent of the antifoaming agent is from about 0.025 to about 0.25.

7. The ink of claim 1, wherein the solvent is selected from the group consisting of cyclohexanone, propylene glycol monomethyl ether acetate, ethylene glycol butyl ether acetate, diethylene glycol ethyl ether acetate, isophorone; dipropylene glycol monomethyl acetate; and combinations thereof.

8. The inks of claim 1, wherein the fluorochemical surfactant has a weight percent of from about 0.1 to about 0.5.

9. The ink of claim 1, wherein plasticizer has a weight percent of from about 0.1 to about 4.0.

10. The ink of claim 1, wherein pigment particles and binder have a ratio of from about 0.03:1.0 to about 0.70:1.0.

11. The ink of claim 1, wherein the ink has a flash point of at least about 61° C.

12. The ink of claim 1, wherein the ink has a percentage solids ranging from about 6% to about 11%.

13. The ink of claim 1, wherein the ink has a viscosity ranging from about 7 to about 11 mPa·sec measured at 25° C. and a shear rate of at least 1000 $sec^{-1}$.

14. The ink of claim 1, wherein the ink has a viscosity ranging from about 8 to about 10.5 mPa·sec measured at 25° C. and a shear rate of at least 1000 $sec^{-1}$.

15. The ink of claim 1, wherein the ink has a specific gravity at room temperature ranging from about 0.97 to about 1.01.

16. The ink of claim 1, wherein the ink has an equilibrium contact angle of paraffin wax ranging from about 2° to about 35°.

17. A method of making an organic solvent-based piezo ink, comprising:

(a) placing pigment into an organic solvent to form a pigment paste; and (b) mixing the pigment paste, binder, plasticizer, fluorochemical surfactant, antifoaming agent comprising silica and silicone oil into the same organic solvent or a different organic solvent.

18. A method of using an ink formulation of claim 1, comprising the steps of activating a piezo ink jet print head and ejecting drops of ink on demand of a size ranging from about a nominal 20 pL to about a nominal 70 pL from the piezo ink jet print head onto a receiving substrate.

19. The method of claim 18, wherein the receiving substrate is a polymeric film selected from the group consisting of single and multi-layer constructions of acrylic-containing films, poly(vinyl chloride)-containing films, urethane-containing films, melamine-containing films, polyvinylbutyral-containing films, a multi-layered film having an image reception layer comprising an acid- or acid/acrylate modified ethylene vinyl acetate resin, a multi-layered film having an image reception layer comprising an image reception layer comprising a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature.

* * * * *